(12) United States Patent
Yang (10) Patent No.: US 11,598,274 B2
(45) Date of Patent: Mar. 7, 2023

(54) ENGINE INTAKE SYSTEM AND CONTROL METHOD THEREOF

(71) Applicants: Hyundai Motor Company, Seoul (KR); Kia Corporation, Seoul (KR)

(72) Inventor: Il Suk Yang, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 0 days.

(21) Appl. No.: 17/412,741

(22) Filed: Aug. 26, 2021

(65) Prior Publication Data

US 2022/0163004 A1 May 26, 2022

(30) Foreign Application Priority Data

Nov. 20, 2020 (KR) .................. 10-2020-0156893

(51) Int. Cl.
*F02D 41/00* (2006.01)
*F02M 35/10* (2006.01)
(Continued)

(52) U.S. Cl.
CPC ......... *F02D 41/0002* (2013.01); *F01M 13/00* (2013.01); *F02F 1/4242* (2013.01); *F02M 31/20* (2013.01); *F02M 35/104* (2013.01); *F02M 35/10255* (2013.01); *F02D 2200/101* (2013.01); *F02D 2200/1002* (2013.01)

(58) Field of Classification Search
CPC ......... F02D 2200/10; F02D 2200/1002; F02D 2200/101; F02M 31/20; F02M 31/10072; F02M 31/10078; F02M 31/10091; F02M 31/10144; F02M 31/10255; F02M 31/10262; F02M 31/104; F02F 1/42; F02F 1/4242
See application file for complete search history.

(56) References Cited

U.S. PATENT DOCUMENTS 4,541,381 A * 9/1985 Sugiura ................. F02P 5/103
  123/406.71
5,012,771 A * 5/1991 Oda ....................... F02B 27/02
  123/184.53
(Continued)

FOREIGN PATENT DOCUMENTS

JP  2002-221036 A  8/2002
JP  3588857 B2  11/2004
KR  10-2013-0046951 A  5/2013

*Primary Examiner* — John Kwon
*Assistant Examiner* — Johnny H Hoang
(74) *Attorney, Agent, or Firm* — Morgan, Lewis & Bockius LLP (57) ABSTRACT

An engine intake system includes: a port partition disposed to divide an intake port of a cylinder head into an upper portion and a lower portion; a first intake manifold configured to supply air, which flows from an air cleaner through a charger and an intercooler, to one of the upper portion and the lower portion of the port partition; a second intake manifold configured to supply the air, which flows from the air cleaner while bypassing the charger and the intercooler, to the other of the upper portion and the lower portion of the port partition; and a bypass valve disposed and configured to pass and block the air flowing into the second intake manifold from the air cleaner.

10 Claims, 10 Drawing Sheets

(51) Int. Cl.
  *F02F 1/42*     (2006.01)
  *F02M 35/104*   (2006.01)
  *F02M 31/20*    (2006.01)
  *F01M 13/00*    (2006.01)

(56) References Cited

U.S. PATENT DOCUMENTS

| | | | | |
|---|---|---|---|---|
| 5,267,543 | A | * | 12/1993 | Novak ............. F02M 35/10072 123/184.52 |
| 5,309,880 | A | * | 5/1994 | Mazzella ......... F02M 35/10078 123/188.14 |
| 5,429,086 | A | * | 7/1995 | Glackin ................ F02F 1/4214 123/188.14 |
| 7,802,555 | B2 | | 9/2010 | Maeda |
| 8,453,446 | B2 | * | 6/2013 | Onishi .................. F02D 41/123 123/568.21 |

* cited by examiner

ENGINE INTAKE SYSTEM AND CONTROL METHOD THEREOF

CROSS REFERENCE TO RELATED APPLICATION

The present application claims the benefit of priority to Korean Patent Application No. 10-2020-0156893, filed Nov. 20, 2020 in the Korean Intellectual Property Office, the entire contents of which is incorporated herein for all purposes by this reference.

TECHNICAL FIELD

The present disclosure relates to an engine intake system, and more particularly, to a technology for a high-efficiency engine that is suitable for a hybrid vehicle, etc.

BACKGROUND

Recently, hybrid vehicles having both an internal combustion engine and a motor or electric vehicles having only a motor have been receiving a more attention than conventional internal combination engine vehicles.

Considering the power from a motor, a high-efficiency lean burn engine is more suitable as the engine of a hybrid vehicle, and in order to implement such a high-efficiency lean burn engine, a large amount of intake air of the engine is necessary and high-level tumble needs to be generated in combustion chambers.

The foregoing is intended merely to aid in the understanding of the background of the present disclosure, and is not intended to mean that the present disclosure falls within the purview of the related art that is already known to those skilled in the art.

SUMMARY

An objective of the present disclosure is to provide an engine intake system that is suitable for a high-efficiency lean burn engine because it can implement a high-flow rate state in which a large amount of intake air can be supplied and a high tumble state in which high-level tumble can be generated, depending on the operation situation of an engine, and a method of controlling the engine intake system.

In order to achieve the objectives of the present disclosure, an engine intake system includes: a port partition disposed to divide an intake port of a cylinder head into an upper portion and a lower portion; a first intake manifold configured to supply air, which flows from an air cleaner through a charger and an intercooler, to one of the upper portion and the lower portion of the port partition; a second intake manifold configured to supply the air, which flows from the air cleaner while bypassing the charger and the intercooler, to the other of the upper portion and the lower portion of the port partition; and a bypass valve disposed and configured to pass and block the air flowing into the second intake manifold from the air cleaner.

The port partition may be disposed at an inlet of the intake port; and a fish belly portion may be formed on a bottom at a combustion chamber-side of the intake port to guide intake air upward.

The first intake manifold may be installed to send air under the port partition; and the second intake manifold may be installed to send air over the port partition.

The first intake manifold and the second intake manifold may form one intake manifold by being integrally formed and may form air channels separated by a manifold partition at an inlet of the intake port.

An end at the intake port of the manifold partition may be aligned with an end of the port partition.

The manifold partition may be formed in a plane shape, and the first intake manifold and the second intake manifold may be formed such that air flows to the manifold partition at acute angles.

The intercooler may be installed at an inlet of the first intake manifold and air that has passed through the intercooler may flow to the manifold partition at an acute angle.

The bypass valve may be installed at an inlet of a bypass duct installed to distribute air to runners of the second intake manifold; and the bypass duct may be installed at an inlet of the second intake manifold such that air that has passed through the bypass duct flows to the manifold partition at an acute angle.

A PCV channel may be integrally formed on an outer side, which is opposite to the manifold partition, of the second intake manifold to distribute blowby gas to the runners of the second intake manifold.

Further, according to the objectives of the present disclosure, a method of controlling the engine intake system includes: determining whether cooling water temperature of the engine, an engine RPM, and engine torque satisfy predetermined reference conditions, respectively; closing the bypass valve when the cooling water temperature, the engine RPM, and the engine torque satisfy all the reference conditions; and opening the bypass valve when even any one of the cooling water temperature, the engine RPM, and the engine torque does not satisfy the reference condition thereof.

The reference condition for the cooling water temperature may be satisfied when the cooling water temperature is a predetermined reference temperature or higher, the reference condition for the engine RPM may be satisfied when the engine RPM is in a predetermined range of lean bun RPM, and the reference condition for the engine torque may be satisfied when the engine torque is in a predetermined range of lean burn torque.

The present disclosure provides an engine intake system that is suitable for a high-efficiency lean burn engine because it can implement a high-flow rate state in which a large amount of intake air can be supplied and a high tumble state in which high-level tumble can be generated, depending on the operation situation of an engine.

BRIEF DESCRIPTION OF THE DRAWINGS

The above and other objectives, features and other advantages of the present disclosure will be more clearly understood from the following detailed description when taken in conjunction with the accompanying drawings, in which.

DETAILED DESCRIPTION

In the following description, the structural or functional description specified to exemplary embodiments according to the concept of the present disclosure is intended to describe the exemplary embodiments, so it should be understood that the present disclosure may be variously embodied, without being limited to the exemplary embodiments.

Embodiments described herein may be changed in various ways and various shapes, so specific embodiments are shown in the drawings and will be described in detail in this specification. However, it should be understood that the exemplary embodiments according to the concept of the present disclosure are not limited to the embodiments which will be described hereinbelow with reference to the accompanying drawings, but all of modifications, equivalents, and substitutions are included in the scope and spirit of the present disclosure.

It will be understood that, although the terms first and/or second, etc. may be used herein to describe various elements, these elements should not be limited by these terms. These terms are only used to distinguish one element, from another element. For instance, a first element discussed below could be termed a second element without departing from the right range of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. On the other hand, it should to be understood that when one element is referred to as being "connected directly to" or "coupled directly to" another element, it may be connected to or coupled to another element without the other element intervening therebetween. Further, the terms used herein to describe a relationship between elements, that is, "between", "directly between", "adjacent" or "directly adjacent" should be interpreted in the same manner as those described above.

The terminology used herein is for the purpose of describing particular embodiments only and is not intended to limit the present disclosure. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which the present disclosure belongs. It must be understood that the terms defined by the dictionary are identical with the meanings within the context of the related art, and they should not be ideally or excessively formally defined unless the context clearly dictates otherwise.

The present disclosure will be described hereafter in detail by describing exemplary embodiments of the present disclosure with reference to the accompanying drawings. Like reference numerals given in the drawings indicate like components.

Figure 1:
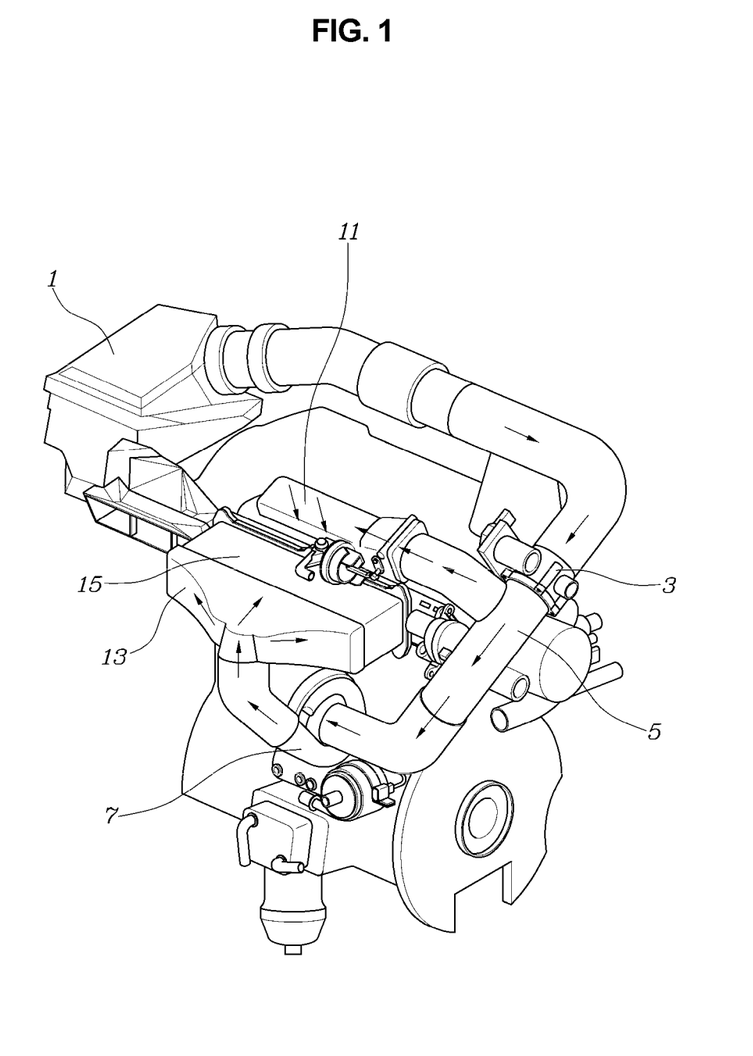
FIG. 1 is a view showing an engine according to an embodiment of the present disclosure.

Referring to FIG. 1, an engine employing the present disclosure is configured such that when air filtered through an air cleaner 1 flows inside while being regulated through a throttle valve 3, the air is divided through an inlet pipe 5 to be supplied to a charger 7 or to be sent to a bypass duct 11 that enables the air to be directly supplied to an intake manifold by bypassing the charger 7.

The charger 7 may be a supercharger. The air that has passed through the charger 7 is supplied to the intake manifold 9 through a surge tank 13 and an intercooler 15, and the intake manifold 9 is configured to distribute the air into combustion chambers of the engine.

Referring to FIGS. 1 to 10, an engine intake system of the present disclosure includes: a port partition 19 installed to divide up and down an intake port 17 of a cylinder head; a first intake manifold 9-1 installed to be able to supply air, which comes from an air cleaner 1 through a charger 7 and an intercooler 15, to any one side divided by the port partition 19; a second intake manifold 9-2 installed to be able to supply the air, which comes from the air cleaner 1 while bypassing the charger 7 and the intercooler 15, to the other side divided by the port partition 19; and a bypass valve 21 installed to be able to pass and block the air flowing into the second intake manifold 9-2 from the air cleaner 1.

That is, according to the engine intake system of the present disclosure, when the bypass valve 21 is closed, air from the air cleaner 1 is supplied only to any one side divided by the port partition 19 of the engine intake port 17 through the first intake manifold 9-1 after passing through the charger 7 and the intercooler 15. When the bypass valve 21 is open, the air from the air cleaner 1 is supplied to the other side divided by the port partition 19 of the engine intake port 17 through the second intake manifold 9-2 after passing through the bypass valve 21 and is also supplied to the first intake manifold 9-1 through the charger 7 and the intercooler 15, so a large amount of intake air can be supplied to a combustion chamber 23 of the engine.

The port partition 19 may be installed in the inlet portion of the intake port 17 and a fish belly portion 25 may be formed on a bottom at the combustion chamber-side of the intake port 17 to guide intake air upward.

Figure 10:
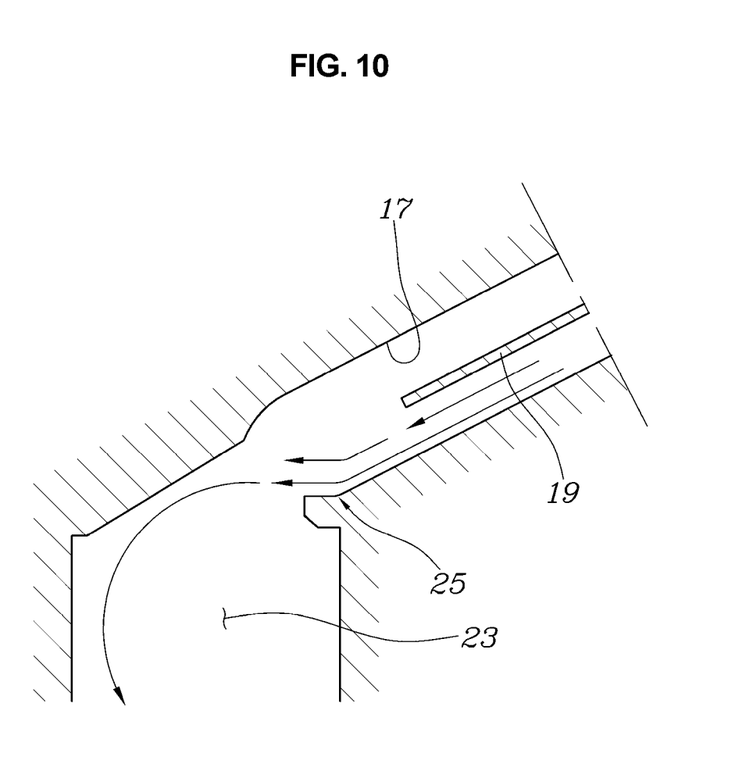
FIG. 10 is a view showing a fish belly portion of an intake port of an engine according to an embodiment of the present disclosure.

As shown in FIG. 10, when intake air is supplied only under the port partition 19 in the intake port 17 having the fish belly portion 25 in the engine, the air guided only under the port partition 19 is guided upward by the fish belly portion 25, thereby increasing tumble in the combustion chamber 23. Accordingly, it is possible to achieve strong tumble in comparison to the case in which air is supplied only over the port partition 19, as in the method of generating tumble generally used in the related art.

The present disclosure can be applied to an engine having the fish belly portion 25 described above, so the first intake manifold 9-1 may be installed to send air under the port partition 19 and the second intake manifold 9-2 may be installed to send air over the port partition 19.

According to this configuration, when the bypass valve 21 is closed, a high-tumble state in which the air charged through the charger 7 is cooled through the intercooler 15 and then supplied only under the port partition 19 through the first intake manifold 9-1 can be generated. When the bypass valve 21 is open, as described above, air is also naturally supplied over the port partition 19 through the second manifold 9-2, so a high-flow rate state of intake air can be generated in the engine.

Figure 3:
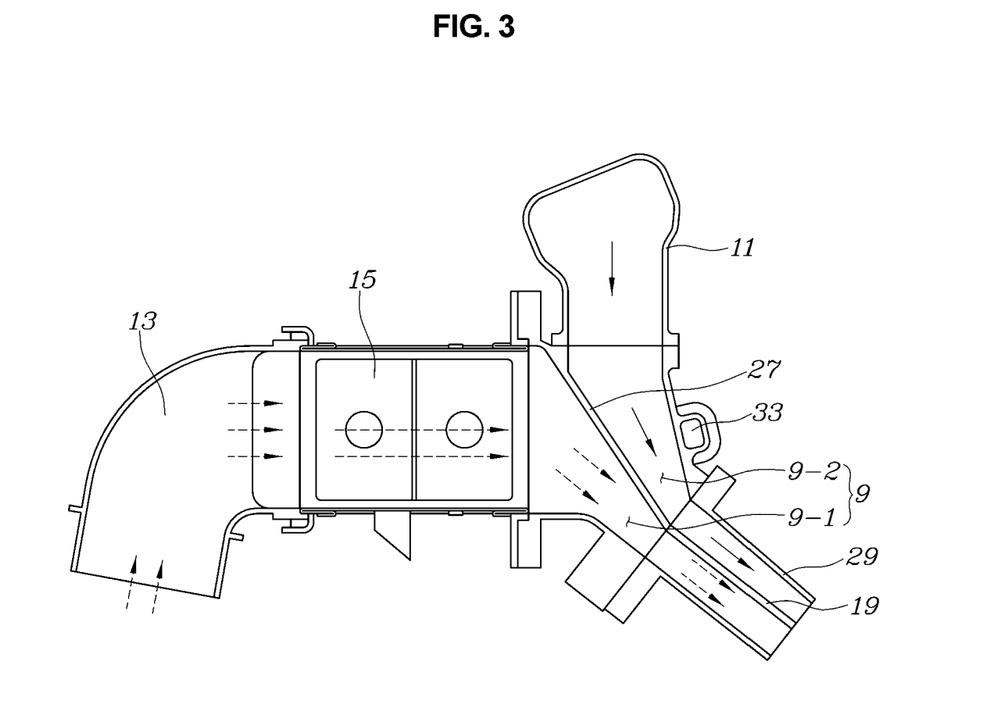
FIG. 3 is a cross-sectional view taken along the line III-III shown in FIG. 2.

For reference, the arrows shown in FIG. 3 indicate flow of air through both the first intake manifold 9-1 and the second intake manifold 9-2 in the high-flow rate state, and the state in which there is no flow through the second intake manifold is the high-tumble state.

The first intake manifold 9-1 and the second intake manifold 9-2 form one intake manifold 9 by being integrally formed and form air channels separated by a manifold partition 27 at the inlet of the intake port 17.

That is, the first intake manifold 9-1 and the second intake manifold 9-2 are formed in a single unit, as shown in FIGS. 4 to 7, whereby the number of parts is decreased and a compact configuration is achieved.

The end at the intake port 17 of the manifold partition 27 is aligned with an end of the port partition 19.

Accordingly, the air flowing through the first intake manifold 9-1 and the second intake manifold 9-2 receive reduced flow resistance and naturally smoothly flow under and over the port partition 19, thereby help improve the intake efficiency of the engine.

For reference, in FIG. 3, the port partition 19 is formed in a tumble adaptor 29 inserted in the inlet of the intake port of the engine, that is, only the tumble adaptor 29 is shown without the intake port of the engine.

Figure 2:
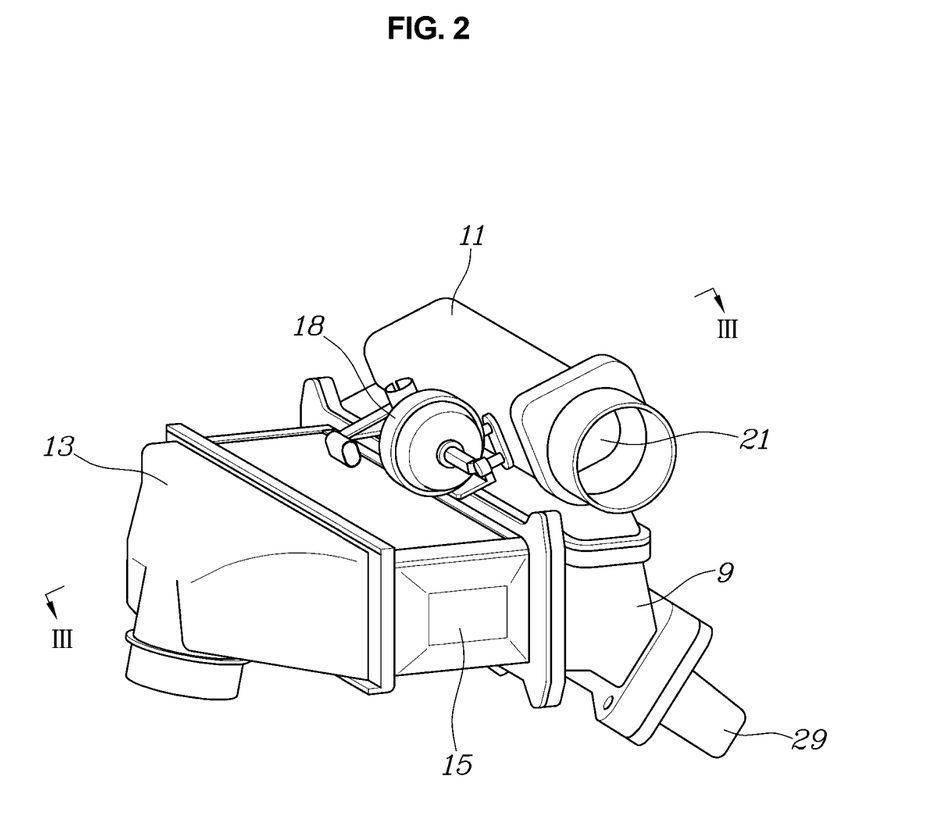
FIG. 2 is a view showing main parts of an intake system according to an embodiment of the present disclosure.

The tumble adaptor 29 is shown also in FIG. 2 and an actuator 18 operating the bypass valve 21 is also shown in FIG. 2.

The manifold partition 27 is formed in a plane shape, and the first intake manifold 9-1 and the second intake manifold 9-2 are formed such that air flows to the manifold partition 27 at acute angles.

The intercooler 15 is installed at the inlet of the first intake manifold 9-1 and the air that has passed through the intercooler 15 flows to the manifold partition 27 at an acute angle.

The bypass valve 21 is installed at the inlet of a bypass duct 11 installed to distribute air to runners 21 of the second intake manifold 9-2 and the bypass duct 11 is installed at the inlet of the second intake manifold 9-2 such that the air that has passed through the bypass duct 11 flows to the manifold partition 27 at an acute angle.

Figure 4:
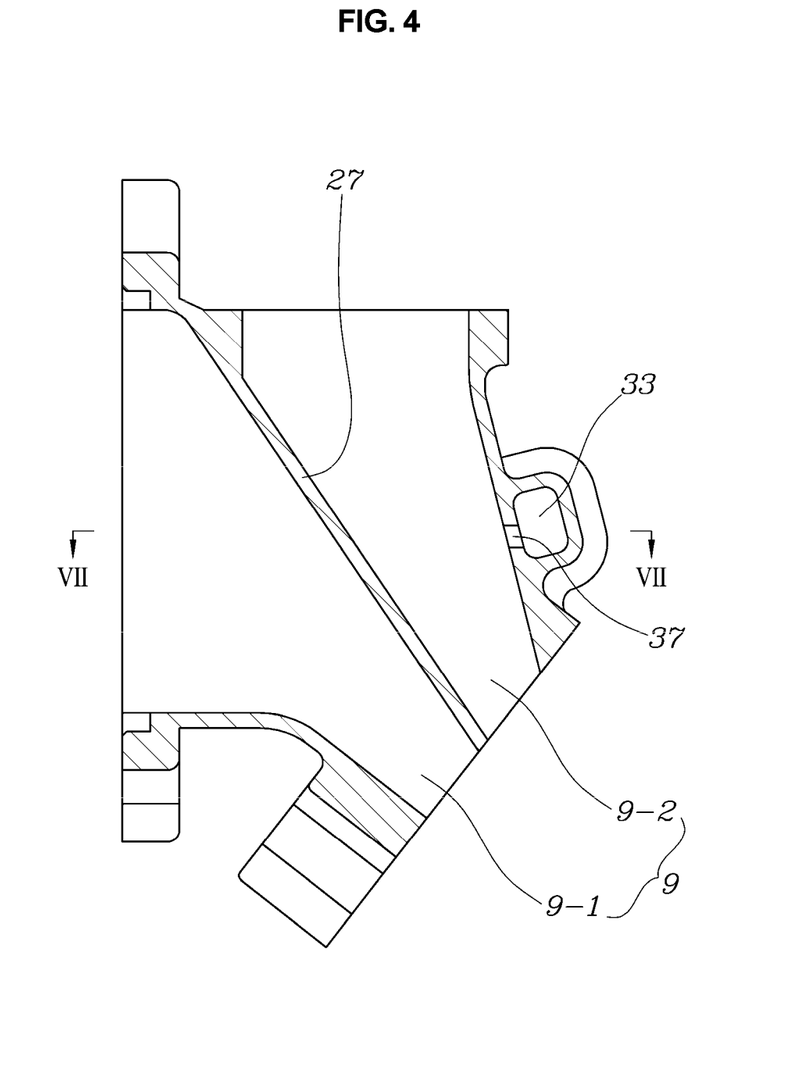
FIG. 4 is a view showing an intake manifold of FIG. 3.
Figure 5:
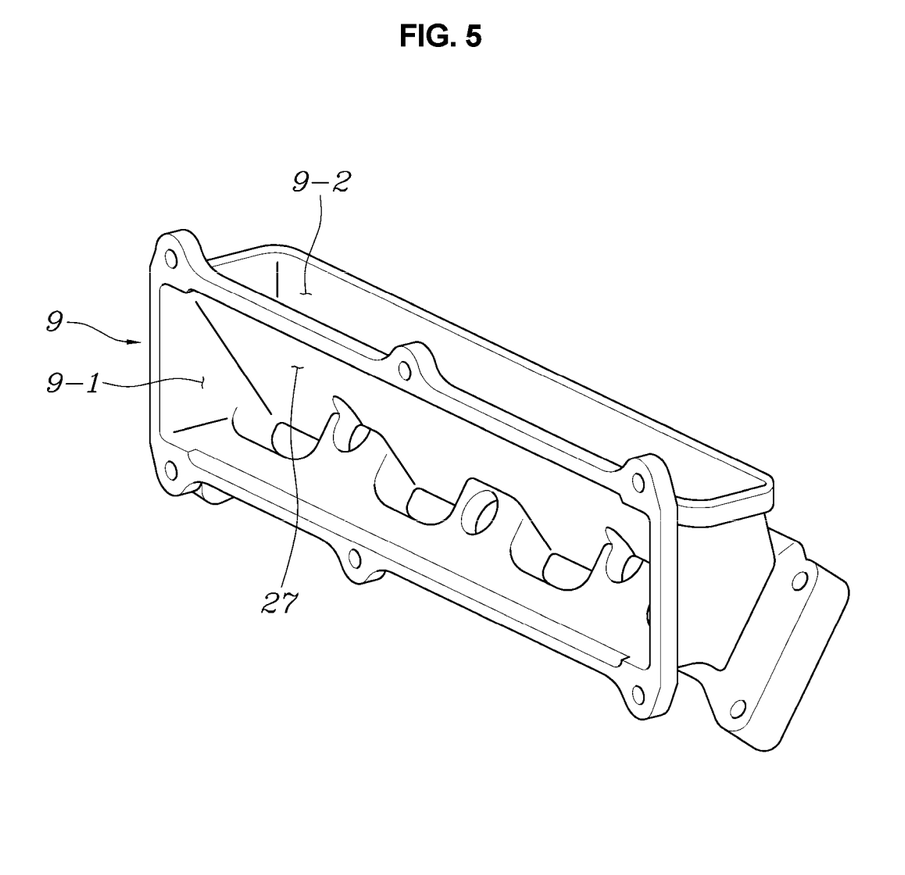
FIGS. 5 and 6 are views three-dimensionally showing the intake manifold according to an embodiment of the present disclosure.
Figure 6:
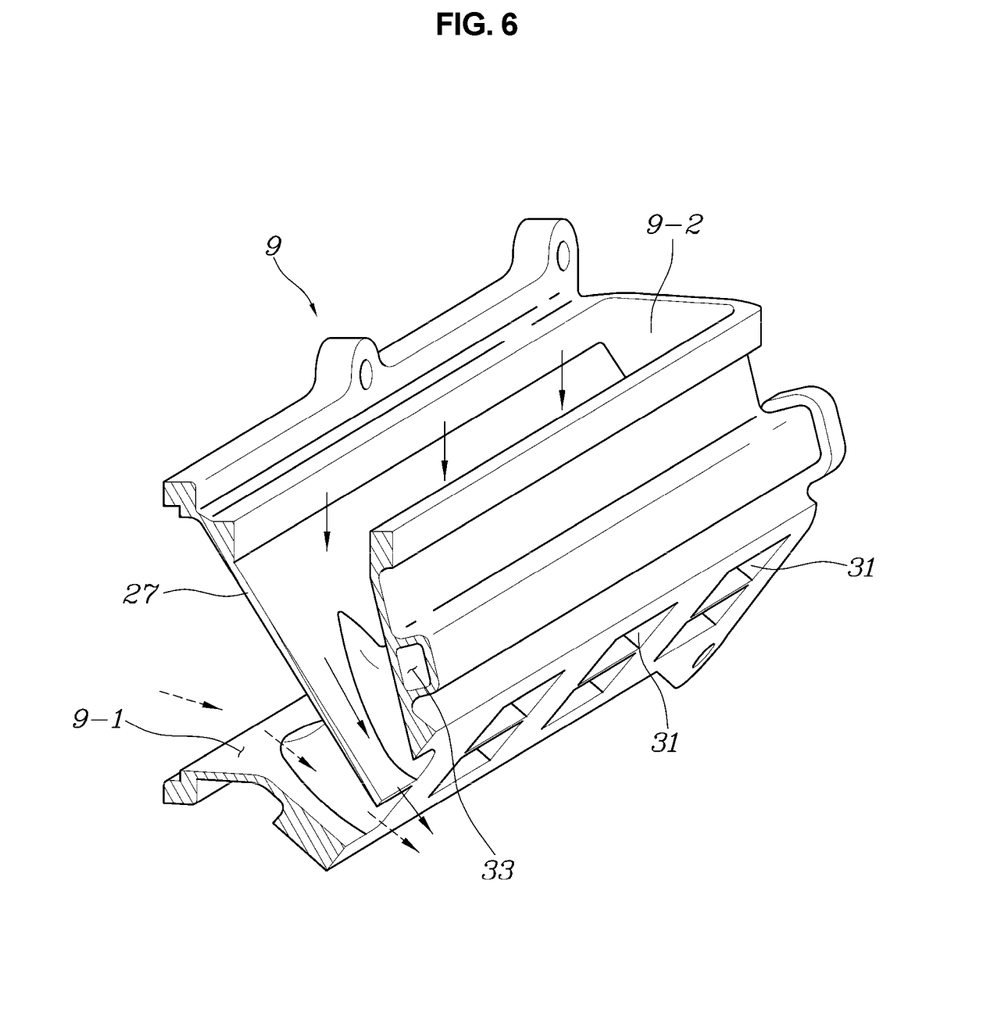

That is, referring to FIG. 4, the intercooler 25 is disposed at the left side of the plane-shaped manifold partition 27, so the air that has passed through the intercooler 15 immediately flows to the manifold partition 27 at an acute angle. Further, the bypass duct 11 is disposed over the manifold partition 27 (see FIG. 3), so the air that has passed through the bypass duct 11 immediately flows to the manifold partition 27 at an acute angle. Accordingly, the air that has passed through the intercooler 15 and the air that has passed through the bypass duct 11 both can pass through the intake manifold 9 under as small flow resistance as possible.

A Positive Crankcase Ventilation (PCV) channel 33 is integrally formed on the outer side, which is opposite to the manifold partition 27, of the second intake manifold 9-2 to distribute blowby gas to the runners 31 of the second intake manifold 9-2, so the blowby gas is uniformly distributed to the intake ports 17 of the engine.

Figure 7:
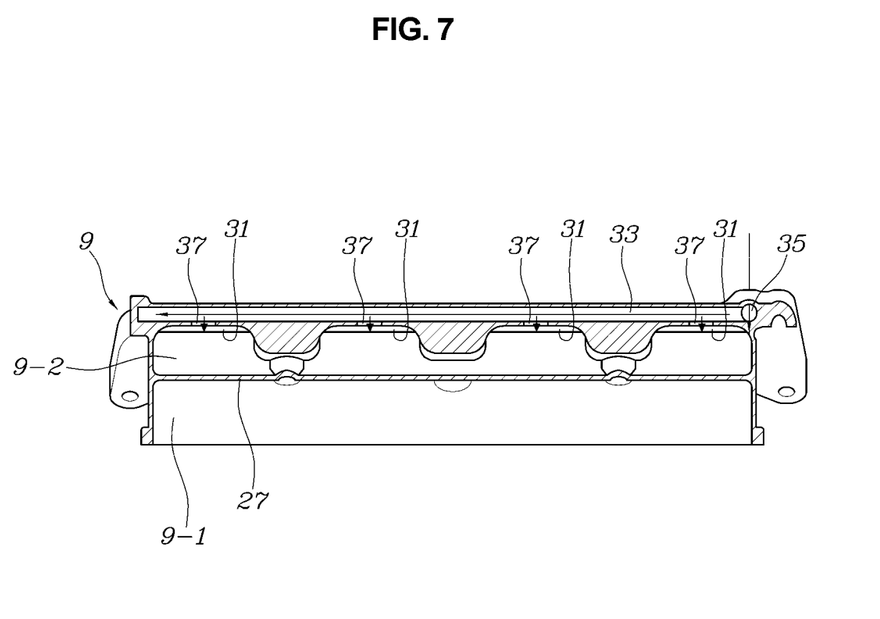
FIG. 7 is a cross-sectional view taken along the line VII-VII shown in FIG. 4.
Figure 8:
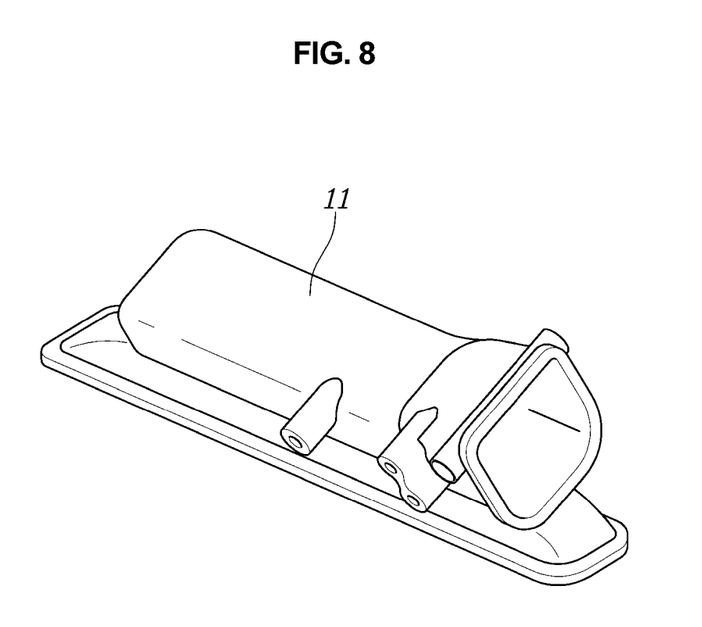
FIG. 8 is a view showing a bypass duct of FIG. 2.
Figure 9:
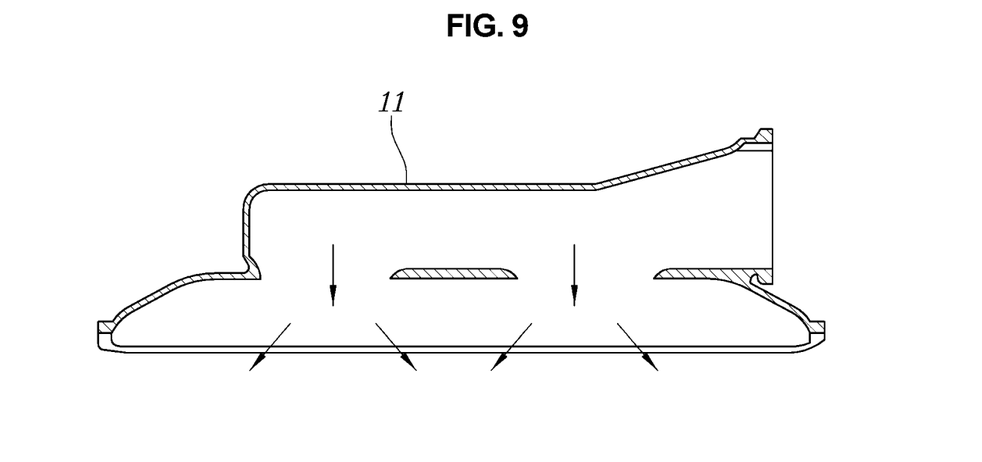
FIG. 9 is a longitudinal cross-sectional view of the bypass duct.

That is, referring to FIG. 7, the blowby gas flowing into a blowby intake hole 35 at the right side is uniformly distributed to the runners 31 of the second intake manifold 9-2 through several distribution holes 37 while flowing through the PCV channel 33.

Figure 11:
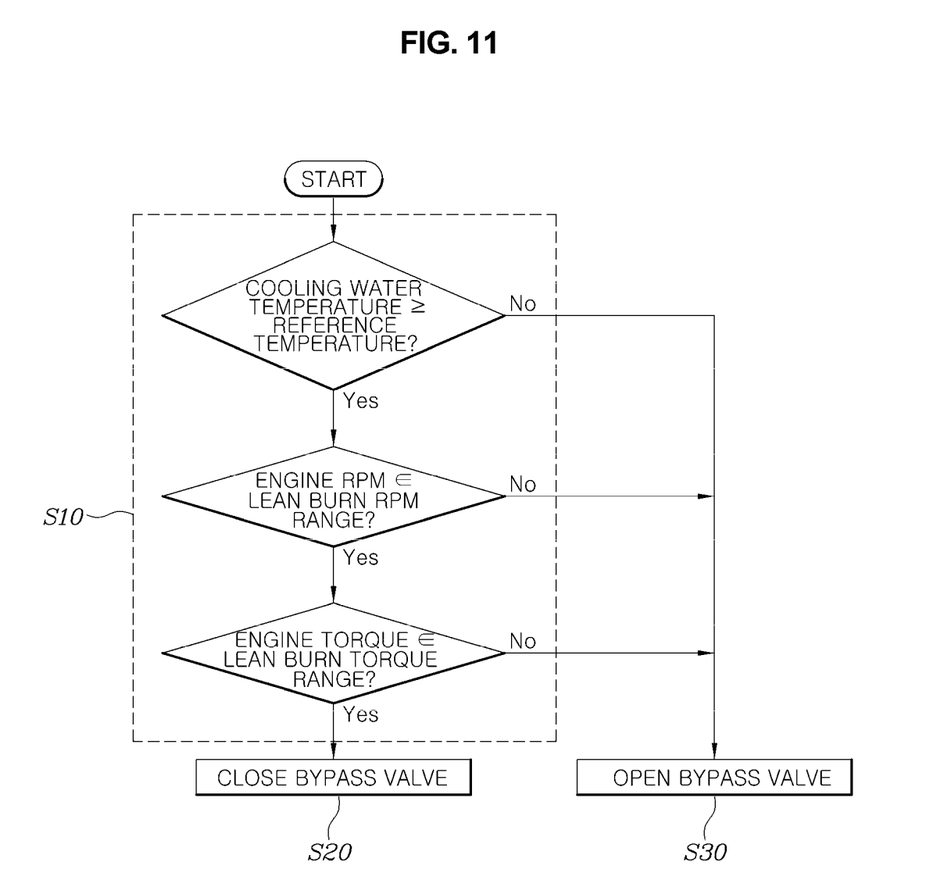
FIG. 11 is a flowchart showing an embodiment of a method of controlling an engine intake system according to an embodiment of the present disclosure.

Referring to FIG. 11, a method of controlling the engine intake system described above includes: determining whether cooling water temperature of an engine, an engine RPM, and engine torque satisfy predetermined reference conditions, respectively (S10); closing the bypass valve 21 when the cooling water temperature, the engine RPM, and the engine torque satisfy all the reference conditions (S20); and opening the bypass valve 21 when even any one of the cooling water temperature, the engine RPM, and the engine torque does not satisfy the reference condition thereof (S30).

That is, the present disclosure opens or closes the bypass valve 21, depending on the states of the engine that can be determined from the cooling water temperature, the engine RPM, and the engine torque, to change the flow or air that is suctioned into the engine.

The reference condition for the cooling water temperature is satisfied when the cooling water temperature is a predetermined reference temperature or higher, the reference condition for the engine RPM is satisfied when the engine RPM is in a predetermined range of lean bun RPM, and the reference condition for the engine torque is satisfied when the engine torque is in a predetermined range of lean burn torque.

That is, for example, the reference temperature may be 60° C., etc. to be able to whether the engine is heated higher than the room temperature and the engine temperature increases to a level at which lean burn is possible.

The range of lean burn RPM and the range of lean burn torque are set such that it is possible to determine whether the operation state of an engine is in an operation range in which lean burn operation is possible. For example, the range of lean burn RPM may be set as 1000 RPM-3500 RPM and the range of lean burn torque may be set as 80 Nm-170 Nm in which lean burn operation of the engine is possible.

The reference temperature, the range of lean burn RPM, and the range of lean burn torque may be set as values that are appropriate in term of design by performing several test and analysis on the engine to which the present disclosure is applied.

As a result, according to the present disclosure, when it is determined that the cooling water temperature, RPM, and torque of an engine are in the range of lean burn in which the lean burn operation is possible, the bypass valve 21 is closed such that air supplied from the air cleaner 1 is charged and air cooled through the intercooler 15 is guided only under the port partition 19 through the first intake manifold 9-1, whereby a high-tumble state in which tumble is generated at a high level in a combustion chambers of the engine by the fish belly portion 25 formed in the intake port 17 is generated. Further, in other ranges, the bypass valve 21 is opened such that air can be naturally suctioned even over the port partition 19 through the second intake manifold 9-2 and can be supplied to the combustion chamber, whereby a high-flow rate state in which a large amount of intake air can be supplied to the engine is generated.

When the high-tumble state is generated in the lean burn operation range, as described above, it is possible to achieve a smooth and stable combustion state even a gas mixture is thin in a combustion chamber. Further, in the other operation ranges, the intake efficiency is maximized by generating the high-flow rate state, which can greatly contribute to improving the power of the engine.

Although the present disclosure was described with reference to specific embodiments shown in the drawings, it is apparent to those skilled in the art that the present disclosure may be changed and modified in various ways without departing from the scope of the present disclosure which is described in the following claims.

What is claimed is:

1. An engine intake system comprising:
    a port partition disposed to divide an intake port of a cylinder head into an upper portion and a lower portion;
    a first intake manifold configured to supply air, which flows from an air cleaner through a charger and an intercooler, to the lower portion of the port partition;
    a second intake manifold configured to supply the air, which flows from the air cleaner while bypassing the charger and the intercooler, to the upper portion of the port partition;
    a bypass duct disposed at an inlet of the second intake manifold so that air that has passed through the bypass duct flows to a manifold partition at an acute angle; and
    a bypass valve disposed at an inlet of the bypass duct and configured to pass and block the air flowing into the second intake manifold from the air cleaner.

2. The engine intake system of claim 1, wherein the port partition is disposed at an inlet of the intake port, and
    wherein the intake port has a fish belly portion on a bottom at a combustion chamber-side, the fish belly portion configured to guide intake air to flow upward.

3. The engine intake system of claim 1, wherein the first intake manifold and the second intake manifold are configured to be integrally assembled as one intake manifold having the manifold partition, which is disposed at an inlet of the intake port and configured to partition inside of the one intake manifold to define air channels.

4. The engine intake system of claim 3, wherein an end of the manifold partition is aligned with an end of the port partition.

5. The engine intake system of claim 3, wherein the manifold partition has a plane shape, and
    wherein the first intake manifold and the second intake manifold are slantly aligned to each other such that air flows to the manifold partition at the acute angle.

6. The engine intake system of claim 5, wherein the intercooler is disposed at an inlet of the first intake manifold and air that has passed through the intercooler flows to the manifold partition at the acute angle.

7. The engine intake system of claim 5, wherein the bypass valve is disposed at an inlet of the bypass duct configured to distribute air to runners of the second intake manifold.

8. The engine intake system of claim 7, wherein the second intake manifold has a Positive Crankcase Ventilation (PCV) channel on an outer side, which is opposite to the manifold partition, of the second intake manifold to distribute blowby gas to the runners of the second intake manifold.

9. A method of controlling an engine intake system including: a port partition disposed to divide an intake port of a cylinder head into an upper portion and a lower portion; a first intake manifold configured to supply air, which flows from an air cleaner through a charger and an intercooler, to the lower portion of the port partition; a second intake manifold configured to supply the air, which flows from the air cleaner while bypassing the charger and the intercooler, to the upper portion of the port partition; and a bypass valve disposed at an inlet of a bypass duct and configured to pass and block the air flowing into the second intake manifold from the air cleaner, the method comprising:
    determining whether a cooling water temperature of an engine, an engine Revolutions Per Minute (RPM), and an engine torque satisfy predetermined reference conditions, respectively;
    closing the bypass valve upon determining that the cooling water temperature, the engine RPM, and the engine torque satisfy all the reference conditions; and
    opening the bypass valve when at least one of the cooling water temperature, the engine RPM, or the engine torque does not satisfy the reference condition thereof.

10. The method of claim 9,
    wherein the reference condition for the cooling water temperature is satisfied when the cooling water temperature is a predetermined reference temperature or higher than the predetermined reference temperature,
    wherein the reference condition for the engine RPM is satisfied when the engine RPM is in a predetermined range of lean bun RPM, and
    wherein the reference condition for the engine torque is satisfied when the engine torque is in a predetermined range of lean burn torque.

* * * * *